United States Patent [19]
Chien

[11] Patent Number: 5,921,653
[45] Date of Patent: Jul. 13, 1999

[54] SUPER-THIN LIGHTING ARRANGEMENT FOR A MOVING OBJECT

[76] Inventor: Tseng-Lu Chien, 8F, No. 29, Alley 73, Lin-Shen Street, Shi-Chi Town, Taipei Hseng, Taiwan

[21] Appl. No.: 08/977,428

[22] Filed: Nov. 24, 1997

Related U.S. Application Data

[63] Continuation of application No. 08/432,707, May 2, 1995, abandoned.

[51] Int. Cl.[6] .................................................. F21L 15/08
[52] U.S. Cl. .......................... 362/103; 362/84; 362/459; 362/234; 280/811
[58] Field of Search .............................. 362/61, 78, 83.3, 362/103, 234, 800, 84, 459, 486, 540, 545; 280/811, 816

[56] References Cited

U.S. PATENT DOCUMENTS

| | | | |
|---|---|---|---|
| 2,572,760 | 10/1951 | Rikelman | 36/1 |
| 3,153,745 | 10/1964 | Gurian et al. | 315/206 |
| 3,946,505 | 3/1976 | Dana, III | 36/2.5 |
| 4,158,922 | 6/1979 | Dana, III | 36/137 |
| 4,494,326 | 1/1985 | Kanamori | 40/593 |
| 4,848,009 | 7/1989 | Rodgers | 36/137 |
| 4,864,473 | 9/1989 | Tokarz et al. | 362/84 |
| 4,895,110 | 1/1990 | LoCascio | 119/106 |
| 4,991,066 | 2/1991 | McCowan | 362/61 |
| 4,997,196 | 3/1991 | Wood | 362/61 X |
| 5,067,058 | 11/1991 | Standley | 362/61 X |
| 5,067,063 | 11/1991 | Granneman et al. | 362/156 |
| 5,119,277 | 6/1992 | Copley et al. | 362/61 |
| 5,245,516 | 9/1993 | de Haas et al. | 362/108 |
| 5,245,517 | 9/1993 | Fenton | 362/156 |
| 5,317,488 | 5/1994 | Penrod | 362/84 |
| 5,327,329 | 7/1994 | Stiles | 362/61 |
| 5,327,587 | 7/1994 | Hurwitz | 2/422 |
| 5,343,190 | 8/1994 | Rodgers | 340/573 |
| 5,406,724 | 4/1995 | Lin | 36/137 |
| 5,430,621 | 7/1995 | Raskas | 362/103 X |
| 5,484,164 | 1/1996 | McInerney et al. | 362/103 X |
| 5,513,080 | 4/1996 | Magle et al. | 362/103 |

FOREIGN PATENT DOCUMENTS

| | | |
|---|---|---|
| 0 121 026 | 10/1984 | European Pat. Off. . |
| 0 166 534 | 1/1986 | European Pat. Off. . |
| 2 227 714 | 11/1974 | France . |

*Primary Examiner*—Stephen Husar
*Attorney, Agent, or Firm*—Bacon & Thomas

[57] ABSTRACT

An illumination arrangement for a small moving object of the type which includes a main object arranged to be moved when an outside force is applied to the object and a moving base arranged to permit the main object to move when the outside force is applied to the main object by overcoming a resistance to movement of the main object which would otherwise be present, includes an illumination arrangement mounted between the moving base and the main object. The moving object can for example take the form of a skate, skate board, or a toy such as a toy car. In the case of a skate, the illumination arrangement is mounted in a transparent outsole which also contains a power supply and all necessary circuitry, the lighting elements used therein being in the form of electro-luminescent strips or panels, and the outsole being secured between the roller or blade mounting bracket of the skate and the boot by including openings for passage of the rivets or similar fasteners used to attach the mounting bracket to the boot. The boot itself may contain openings, such as ventilation openings, through which additional illumination elements attached to a soft liner can be viewed, or the object may itself be transparent and the illumination elements affixed to an inside surface of the main object.

27 Claims, 9 Drawing Sheets

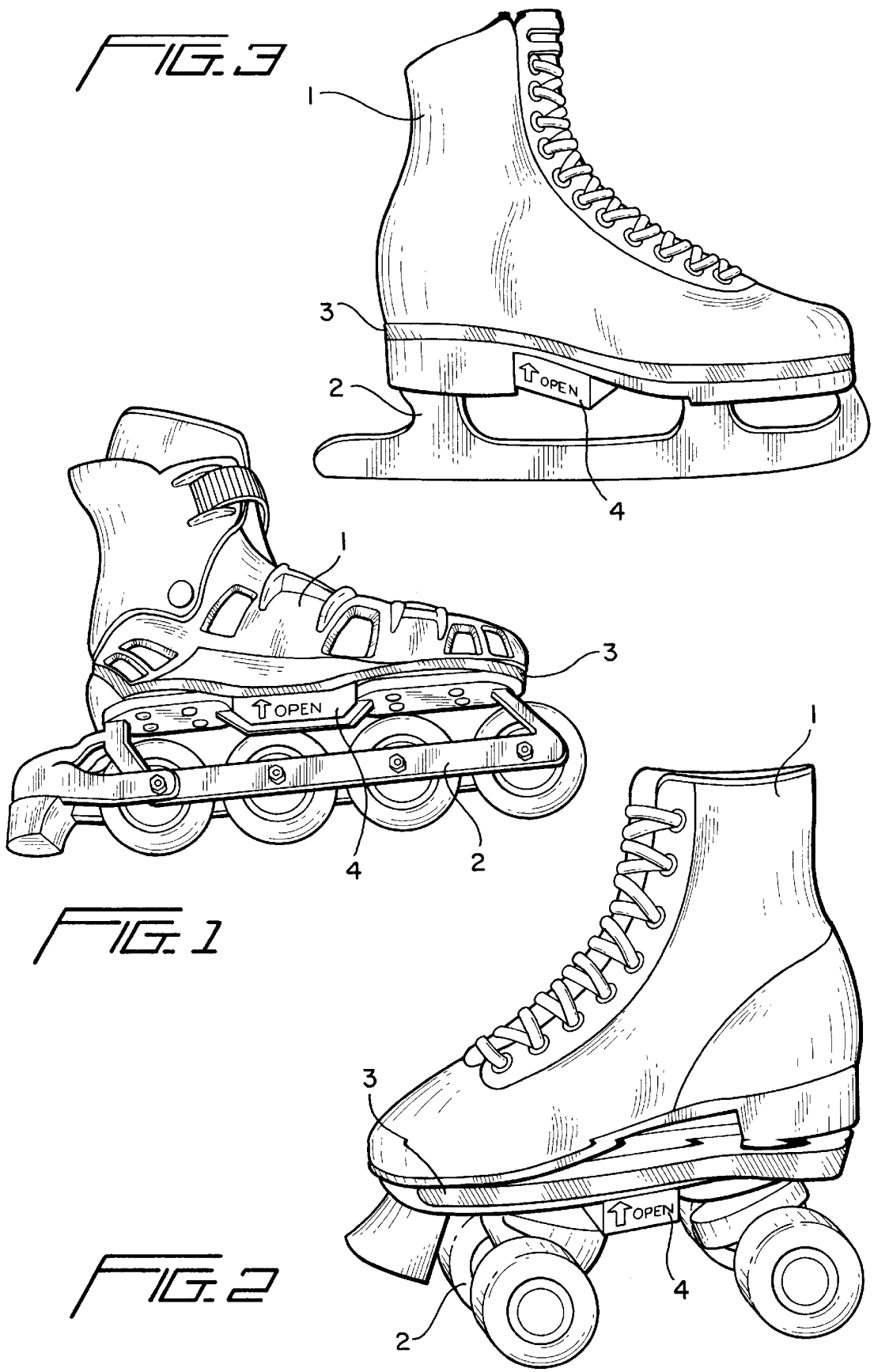

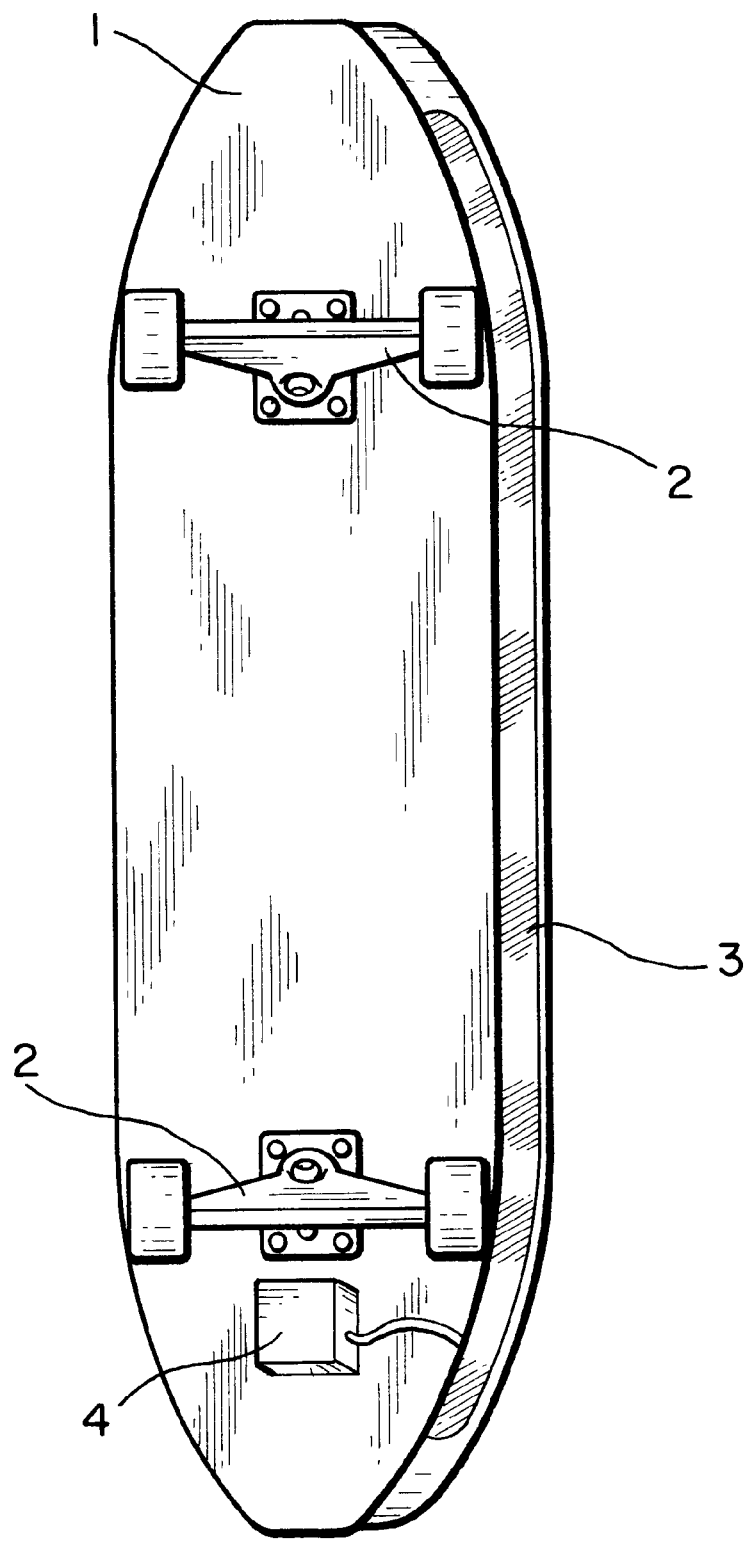

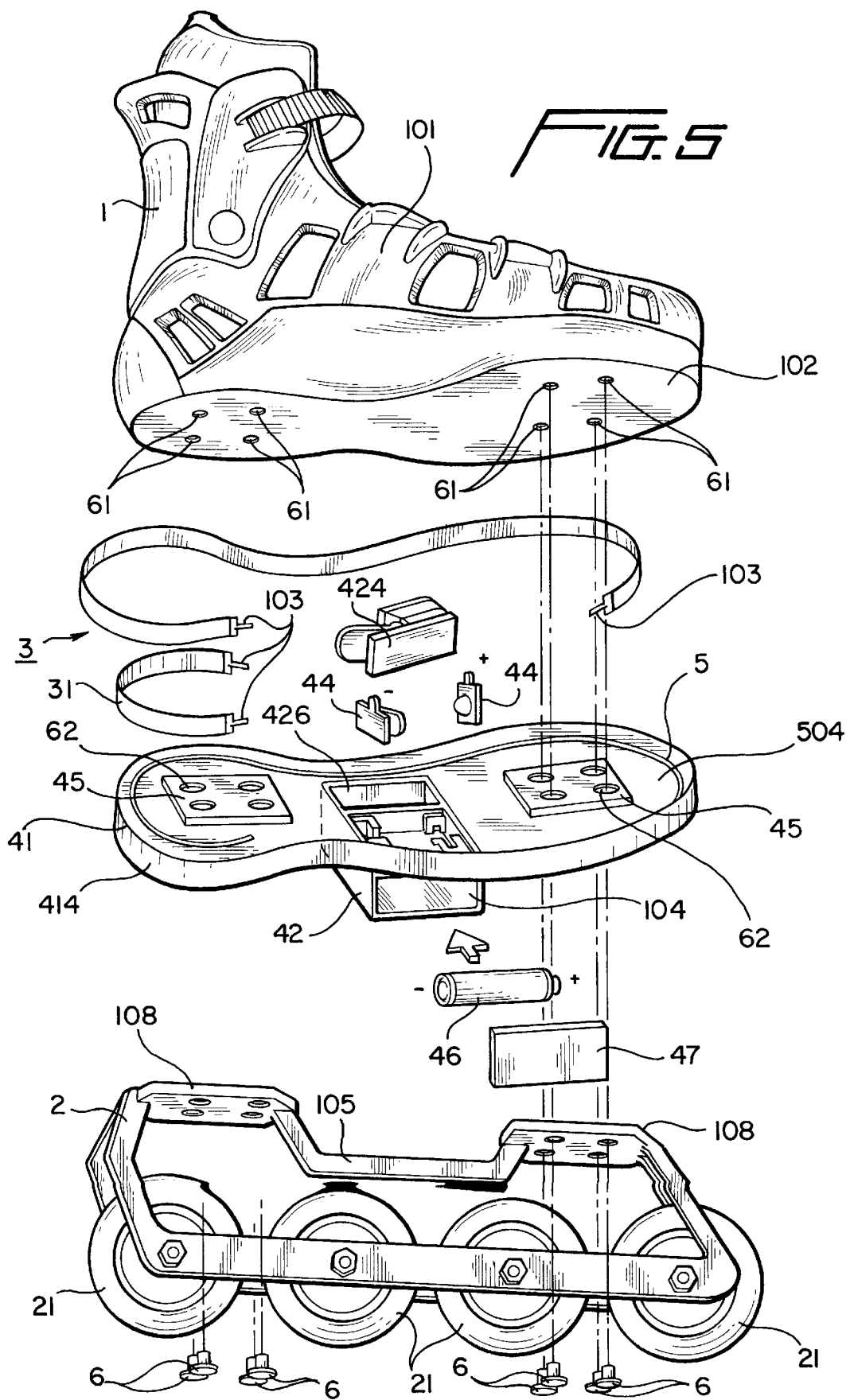

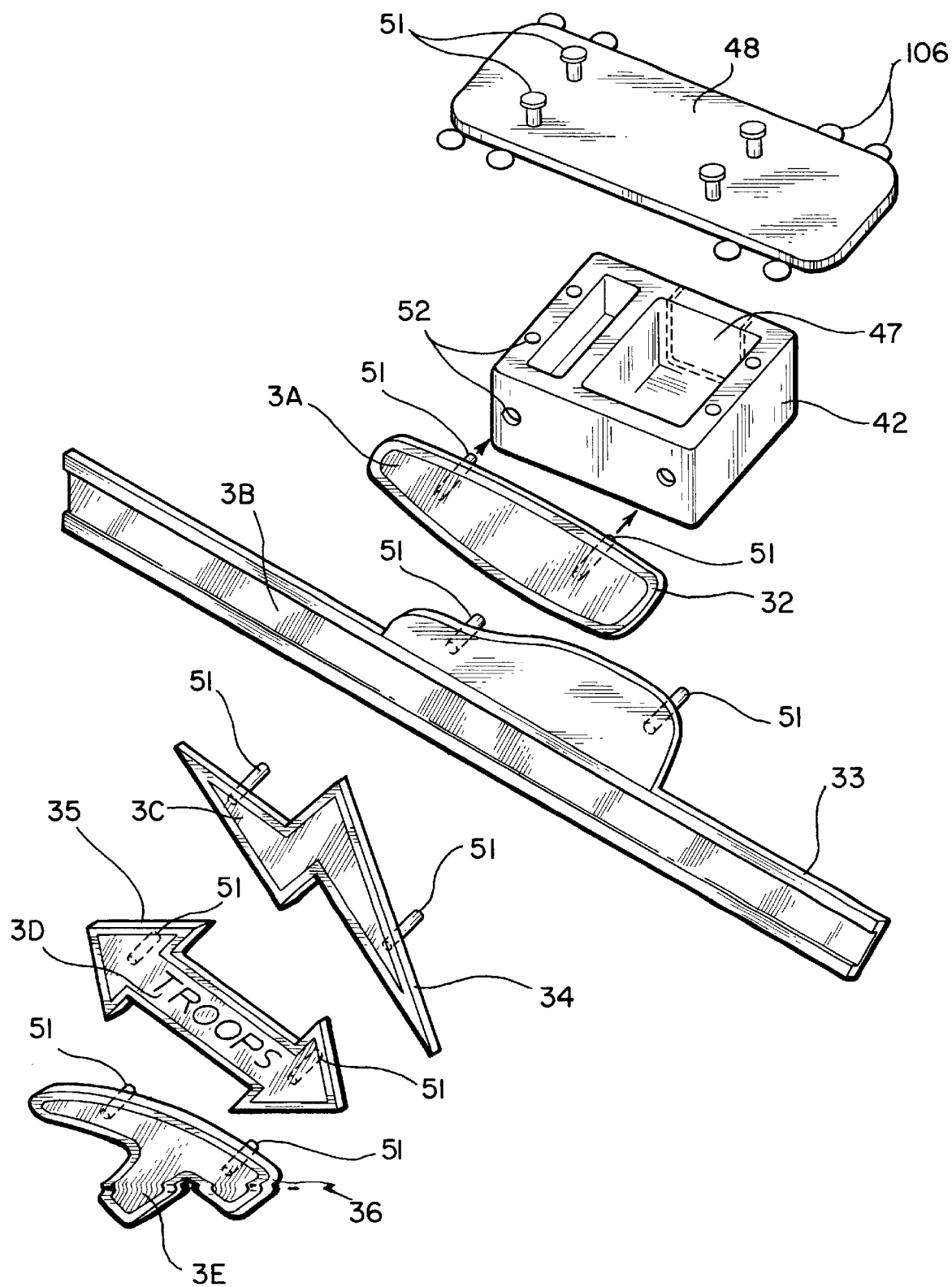

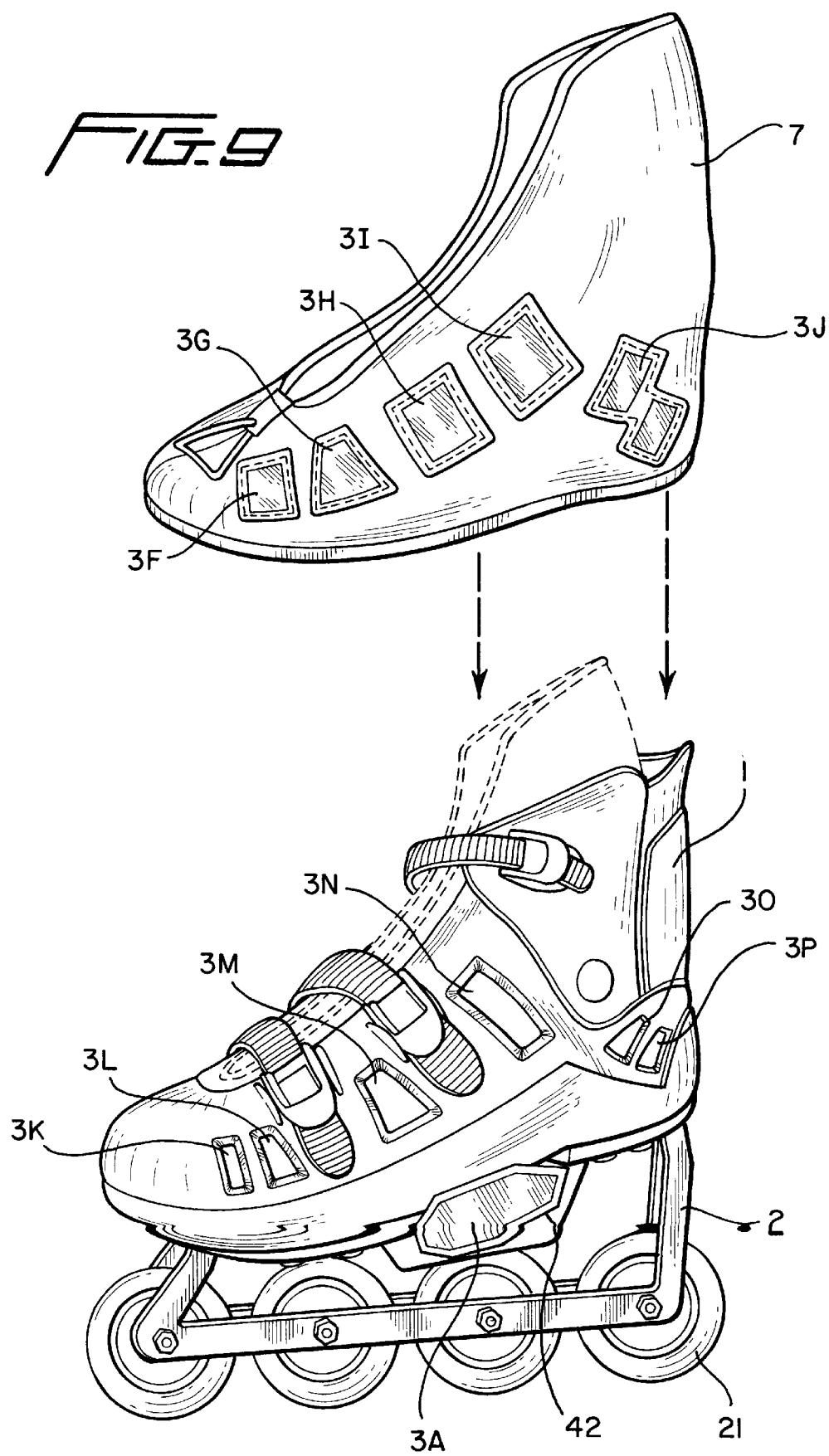

SUPER-THIN LIGHTING ARRANGEMENT FOR A MOVING OBJECT

This application is a Continuation of application Ser. No. 08/432,707, filed May 2, 1995, now abandoned.

BACKGROUND OF THE INVENTION

1. Field of the Invention

This invention relates to apparatus made up of a main object, which is moved when an outside force is applied to the object, a moving base which permits the object to move when the outside force is applied to the main object by overcome the resistance to movement which would otherwise be present, an illumination arrangement for the main object and moving base, and an electrical system for the illumination arrangement. The main object may, for example, be the boot of a roller or ice skate, the board of a skate board, or a toy such as a toy car or animal, and the moving base can take the form of, for example, a roller or ice skate bracket, or a bracket for mounting wheels on a toy. The illumination arrangement may include super-thin electro-luminescent (EL) or photo-luminescent (PL) strips or panels.

2. Discussion of Related Art

Illumination of moving objects enhances the attractive of the objects and, in the case where the object is to be worn, protects the wearer by making the wearer more visible to motorists. Lighting arrangements for self-propelled vehicles such as automobiles and bicycles are of course well-known, but the present invention concerns illumination of relatively objects which are moved by an external force, including objects designed to be worn, such as skates, as well as objects such as skate boards and various toys which are pushed or pulled by the user.

The objects with which the invention is concerned have in common a "main object," i.e., an object to which the propelling force is to be applied, such as the boot of a skate, the board of a skate board, or the body of a toy car, and also some type of bracket-mounted "moving base" in the form of rollers, blades, or wheels positioned between the main object and the ground, for overcoming the resistance between the main object and the ground.

The traditional means of providing illumination for such objects, if illumination could be provided at all, has been to use incandescent bulbs or light emitting diodes (LEDs). While the present invention can actually be used in combination with conventional lighting, the invention is particularly suited to be implemented by means of EL strips or panels.

One of the problems with conventional lighting arrangements for a small moving object such as a roller skate, in which incandescent bulbs or LEDs are placed on the outsole, upper surface, or wheel of the skate, is that the bulb or LED must be placed in recesses in order to protect it from damage, and it is to find room for providing such a recess into which the bulb or LED is fit so that the bulb or LED is not exposed to impact. The smallest commercially available incandescent bulbs or LEDs have a diameter of at least 3 mm and a length or height of at least 10 mm, which greatly limits the available areas to which the bulbs or LEDs can be applied.

In addition to the problem of placement of the bulb or LED itself, there is the problem of placement of the connecting wires, as well as the need for expensive tooling, in the case of roller or ice skates, to provide for the at least eight different standard shoe sizes four different sizes of roller or ice skate brackets. As a result, although the concept of lighting small movable objects such as skates, skate boards, toy cars, and the like is known, the use of conventional lighting arrangements in such objects is generally impractical and often impossible.

As discussed in greater detail below, one of the objectives of the invention is to provide an illuminated small movable object, including a main object and a moving base, which is easily assembled and yet which provides a wide variety of lighting design possibilities, including flexibility in placement of the lighting, color choices, lighting effects, and so forth, in a package which is as durable as it is attractive. This involves, at least in part, the use of EL panels or strips as the lighting source.

By way of background, EL strips or panels have been proposed for use in a variety of products to enhance their safety and attractiveness, and have the advantages of being paper-thin, light in weight, flexible, easily attached to different surfaces by adhesives or by stitching, and relatively bright, colorful, and with a wide viewing angle in comparison with other lighting sources. Furthermore, although bright, the light from an EL strip or panel, like that of neon, is gentle and will not cause eye-strain, which is very important for roadside safety. In contrast, LEDs of reasonable cost and sufficient brightness are only available in red, which most European countries prohibit for non-emergency use because of potential confusion with official warning or stop signs, and with emergency or hazard warnings. Green and amber LEDs of brightness equivalent to red LEDs are too expensive for use in consumer products, while all LEDs suffer from the problem of a narrow viewing angle and cannot practically cover as a large an area as EL strips or panels.

Despite the relative advantages of EL strips or panels, however, a practical way of applying the EL strips or panels, or equivalent photo-luminescent (PL) lighting elements, to small objects of the type discussed above has not previously been devised or even, to the inventor's knowledge, previously been proposed.

SUMMARY OF THE INVENTION

It is accordingly an objective of the invention to provide an illumination device for a movable object of the type which includes a main object to which an external force is applied in order to move the object, and a movable base which facilitates movement of the object by overcoming ground-to-object resistance or friction, examples of which include various types of skates, skate board, and movable toys such as toy cars or wheeled dinosaurs, and which overcomes the above-mentioned problems of the prior art by utilizing EL strips for the illumination, thereby making use of the EL strip's paper thinness and super bright neon-like color.

It is a further objective of the invention to provide an illumination arrangement for a movable object of the above-mentioned type which is easily assembled, durable, and provides a wide variety of lighting effects, including placement of the lighting elements both on the object and in the movable base, without the use of bulky power supply and wiring arrangements which would interfere with the operation and attractiveness of the object.

These objectives are achieved, in accordance with a preferred embodiment of the invention, by mounting the lighting arrangement power supply and illumination means in a transparent outsole, or in a similar transparent plate-like device, which utilizes the existing installation means for connecting the main object with its movable base and is shaped to be flush against the lower surface, e.g., the sole, of the main object. For example, in accordance with illustrated implementations of the preferred embodiment of the invention, the outsole can be provided with openings in a reduced thickness part of the outsole through which the bracket mounted rivets or bolts used in conventional skates and skate boards are passed, with circuitry, a power supply, and illumination strips being sandwiched between the outsole and the sole of a boot to protect the components from impacts and the environment. In other implementations of the invention, EL strips are placed elsewhere on the moving base and also on a soft textile liner which fits within the conventional hard plastic boot used in roller and ice skates, with the EL strips being visible through ventilation openings in the boot, or the boot itself is made of a transparent material and the EL strips are attached directly to the inside of the boot. In still further implementations of the preferred embodiment of the invention, the power supply housing is provided with quick-connect terminals for more easily connecting thereto a variety of different lighting elements.

The use of a transparent outsole of the type described above has the advantage of providing a "module" which can be used in a variety of contexts. In addition, the transparent outsole edge can be used to add special optical effects, such as a prism effect, to increase the attractive of the interior components, for example by making the curve shape have a convex lens effect to magnify the light strips.

Also preferably, by making the plates or plate portions containing openings (through which the installation means are passed) thin enough, the invention minimizes the distance between the main object and movable base, whether in the form of a skate, skateboard, or wheeled toy, small enough to use existing rivets, bolts, screws, or other installation means without the need for re-tooling.

Because an EL strip only requires two connecting wires, the power pack and connections can easily be made to achieve any desired pattern and performance. For example, where the main object is the boot of a skate, the EL strip can easily be bent into any curve on the boot to follow the edge of the outsole placed between the boot and the roller bracket or blade mounting bracket which constitutes the moving base of the movable object. The EL panel or strips can be designed for any desired length and width, and only need contact two upper layers and the bottom layer with a sufficient voltage drop to cause photons in the phosphor to be triggered continuously or intermittently, depending on the arrangement and material of the phosphor, using only the two wire connection, thus solving connection problems associated with bulbs or LEDs.

Advantageously, the wire connections for the EL strips or panels can be involve two terminals at opposite ends, at the same end, or be of the type in which contact can be obtained at any location on the backside of the EL panel or strip, using conductive rubber to connect the electric power pack directly to the backside of the EL panel or strip, as disclosed in copending U.S. patent application Ser. No. 08/383,404, filed Feb. 3, 1995. Also, the individual EL strips can be mono or multi-colored and can consist of a single strip or multiple strips connected in series or in parallel to have different turn-on times to form a motion effect, and the individual EL strips or panels, or portions thereof, can be controlled by a conventional trigger circuit or by integral IC design to allow a variety of special effects. Preferably, the power source is a simple DC power source, such as a combination of batteries, which is converted to AC voltage at a required frequency to obtain the desired voltage level.

As noted above, the outsole with its self-contained housing for loading all electric components, batteries, and a switch can be designed to protect the components against a variety of hazards, including impacts, scratches, and water. Furthermore, by mounting the EL strips or panels in grooves in the transparent outsole, or inside the main object itself utilizing the main object's ventilation openings or transparency to view the EL strips or panels, or other lighting devices, the EL strips or panels themselves can be protected from damage.

Those skilled in the art will appreciate, upon reading the following description, that the above described advantages of the advantage are by no means exhaustive, and that the invention involves numerous unique concepts which nevertheless combine to form a novel and non-obvious whole. Among the key overall concepts is, however, as indicated above, the application of the invention to a main object of the type which is movable upon application of an external force and a movable base which overcome the resistance to movement of the main object, and in particular the provision of an illumination means whose power supply and control circuit is providing in a member which is attached to the main body and the movable base by installation means for attaching the main body to the movable base.

BRIEF DESCRIPTION OF THE DRAWINGS

FIG. 1 is a perspective view of an illuminated main object and moving base in the form of an in-line roller skate constructed in accordance with the principles of a preferred embodiment of the invention.

FIG. 2 is a perspective view of an illuminated main object and moving base in the form of a conventional roller skate constructed in accordance with the principles of a preferred embodiment of the invention.

FIG. 3 is a perspective view of an illuminated main object and moving base in the form of an ice skate constructed in accordance with the principles of a preferred embodiment of the invention.

FIG. 4 is a perspective view of an illuminated main object and moving base in the form of a skate board constructed in accordance with the principles of a preferred embodiment of the invention.

FIG. 5 is an exploded perspective view of the main object and moving basing implementation illustrated in FIG. 1.

FIG. 5A is an exploded perspective view of a variation of the power pack arrangement shown in FIG. 5, including a variety of alternative power pack mounted illumination means.

FIG. 9 is a perspective view of a main object illumination arrangement which can be used with the implementations of the preferred embodiment illustrated in FIGS. 1–6.

DETAILED DESCRIPTION OF THE PREFERRED EMBODIMENTS

Figure 10:
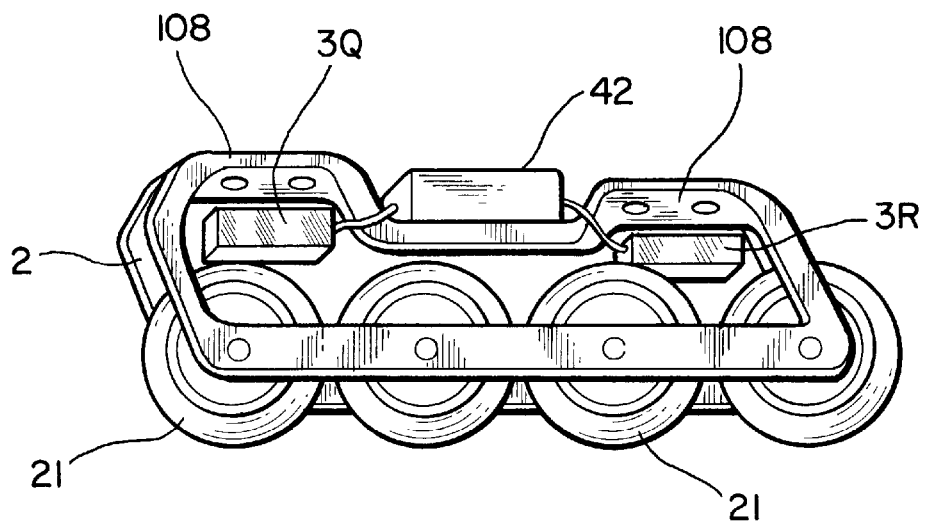
FIG. 10 is a perspective view illustrated a moving base lighting arrangement which can be used with the implementations of the preferred embodiment illustrated in FIGS. 1–6.

FIGS. 1–4 show four implementations of an illuminated main object and moving base constructed in accordance with the principles of a preferred embodiment of the invention. Although FIGS. 1–4 respectively illustrate an in-line roller skate, a conventional side-by-side roller skate, an ice skate, and a skate board, those skilled in the art will appreciate that the principles of the invention are applicable to a wide variety of similar objects having a main body and moving base, including various toys such as toy cars or dinosaurs having roller devices attached thereto. Consequently, portions of the invention will be described in terms of "means" and it is to be understood that these means can have a variety of forms other than the forms specifically illustrated, so long as they perform the functions described in connection therewith.

Each of the implementations illustrated in FIGS. 1–4 has in common a main body 1 and moving base 2. The forms of the main body 1 and moving base 2 differ between the implementations shown in the respective drawings, but for purposes of the invention may be considered equivalent since details of the main body and moving object, which are a boot or board and a roller bracket or blade in the respective implementations, are known and not a part of the invention, the invention instead concerning the manner in which an illumination means 3, power pack are attached thereto. The remaining figures shown these features in greater detail.

The main object and moving body in the form of an in-line skate as shown in FIG. 1 is shown in greater detail in the exploded perspective view of FIG. 5. In this implementation, the main body 1 is a boot having an upper portion 101 of conventional construction and a sole 102 which includes a plurality of openings 61 for accommodating installation means for mounting the main body 1 to the base 2. In the illustrated implementation, the installation means 6 is in the form of rivets by which the moving base 2, which in this implementation is in the form of a roller bracket set on which are mounted rollers 21, is attached to the sole 102.

Those skilled in the art will appreciate that the use of rivets to attach a roller bracket set to the sole of a boot in an in-line skate is conventional, which in fact is an advantage of the present invention because it make use of the existing rivets thereby avoiding the need for a separate assembly dedicated to this purpose. Nevertheless, the use of the terminology "installation means" is intended to convey that it is also within the scope of the invention to utilize a variety of different mounting arrangements for the main object-to-moving base installation and for mounting the outsole 41 which supports the electrical componentry and certain of the lighting means used in the present invention, as described below.

In the illustrated embodiment, the illumination means 3 is in the form of EL strips which are especially suited for this application for the reasons mentioned above in terms of performance and connectability, as well as flexibility which permits the EL strips to extend around the periphery of the outsole if desired. The exact pattern by which the EL strips, illustrated as a main EL strip and also an additional strip 31, are arranged in the outsole 41 may of course be freely varied using the mounting arrangement described below.

Outsole 41, as illustrated, is preferably made of a transparent material having an EL strip attachment means 5. In this implementation, attachment means 5 is in the form of a groove extending in a desired pattern from an upper surface 504 of the outsole 41. When the outsole 41 is attached to the boot, the EL strip groove will be protected from shocks as well as moisture, dust, and so forth, because the groove is only exposed at the surface which faces and engages sole 102 of the boot. In addition, the transparent outsole edge 414 can be used to add special optical effects, such as a prism effect, to increase the attractive of the interior components, for example by making the curve shape have a convex lens effect to magnify the light strips.

Power to the EL strips in this implementation is supplied via terminals 103 at ends of the EL strips via wires (not shown) from a power pack made up of a housing 42 having two compartments, one of which contains battery terminals 44 and is accessed through an opening 104 for permitting insertion of a battery 46, the opening being closed by a cover 47. The second compartment, which may be sealed, includes a circuit board 424 and all circuit components (described in more detail below) necessary to convert the DC power supplied by the battery to AC power of an appropriate frequency to trigger the EL strip, and also to provide such special effects as flashing or varying illumination of the respective EL strips if desired.

In this implementation, the power pack is located below the insole, in a space provided by a lowered portion 105 of the moving base or roller bracket set 2, with the top 426 of the housing 42 being open through the outsole for the purpose of facilitating assembly of the electrical components in the housing. When the outsole 41 is affixed to the sole 102 by being sandwiched between the moving base 2 and main object 1 via installation means 6, then the components will be completely sealed within the housing, particularly if a gasket is provided as an environmental seal (not shown) around the outsole.

By including all sensitive components within the outsole, and sealing the outsole as mentioned above, the outsole form a module which is easily replaceable, can be used in a variety of applications, and yet can protect the components against a variety of hazards, including impacts, scratches, and water. Advantageously, for example, the battery compartment may be provided with two waterproof battery terminals on each end, and two terminals may be pre-assembled from inside of the outsole to prevent the user from removing these two terminals, and a waterproof door 47 can be used to provide access and easy replacement of the battery. The compartment door 47 can be designed for a hinge or snaps, or be of a sliding type to allow the user to easily operate it when needed.

Alternative to the power pack installation shown in FIG. 5, the power pack may be provided, as shown in FIG. 5A, in "snap-on" form and itself illuminated, by providing a thin mounting plate 48 between the rivet or other installation means locations 106, and which is attached to the power pack by means of an interference fit or snap fit arrangement made up of openings 52 and corresponding post/terminals 51. As in the implementation illustrated in FIG. 5, the housing of the implementation of FIG. 5A includes two compartments, one for the battery, including an access door or gate 47, and one for the electric circuitry, but this implementation does away with the need for wires because the "posts" are also terminals pre-wired to through the housing to the appropriate power supply circuitry. The use of a combination mounting post/terminal arrangement also permits mounting of EL strips or other lights on the power pack itself, for example by means of alternatively mountable holders 32–36 which consist of an outer terminal 201 to which is directly attached one of the terminals, the remaining terminal being electrically connected anywhere on the surface of the respective EL strips 3A–3D in the manner described for example in the above-mentioned copending U.S. patent application Ser. No. 08/383,404. Those skilled in the art will appreciate from FIG. 5A the flexibility which this design provides, since one can easily change the shape of the lighting means by simply snapping a different one of holders 32–36, all of which have different shapes into terminal openings 52 on the side of the housing.

Figure 6:
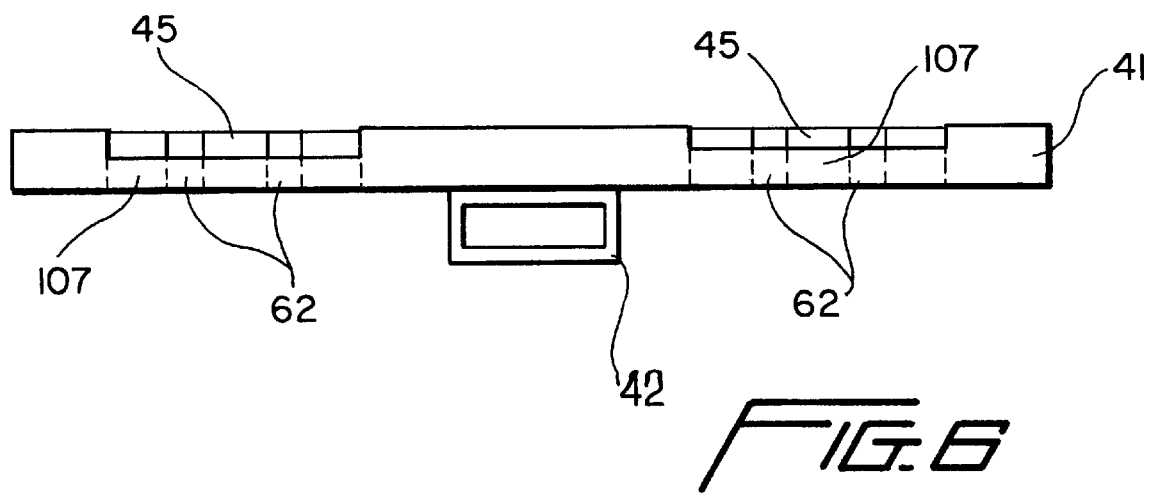
FIG. 6 is a side view of the outsole of FIG. 5, illustrating the manner in which the mounting brackets are inset into the outsole for flush mounting.

Returning to FIG. 5, and also as shown in FIG. 6, outsole 41 is preferably provided with recessed areas 45 defined by indentations 107 which contain the openings through which the rivets, in this implementation, are passed so as to connect main object in the form of a boot 1 and moving base in the form of a roller bracket set 2. By using indentations 107 which extend into the outsole from the moving base side of the outsole, the mounting portions 108 of the roller bracket set are flush with or set into the outsole so that the overall height of the arrangement, when assembled together, is not greatly increased, as is apparent from FIG. 6, and the need for longer rivets or other non-standard installation means is eliminated.

Those skilled in the art will appreciate that although only the in-line skate implementation has been illustrated in detail using exploded views, the construction of the conventional side-by-side roller skate, ice skate, and skateboard all can be similar since all share the features of brackets on which either rollers or a blade is mounted, and a sole or board which can be provided with holes for the installation means, such as rivets. Essentially, adaptation of the invention to these embodiments will simply involve exchanging a different type of moving base, whether with rollers, a blade, or other means of locomotion for the illustrated roller bracket set, and exchanging a different main object, whether in the form of a boot, a board, a body of a toy, or something else having a surface to which the moving base and a clear structure corresponding to the outsole can be mounted.

Figure 7:
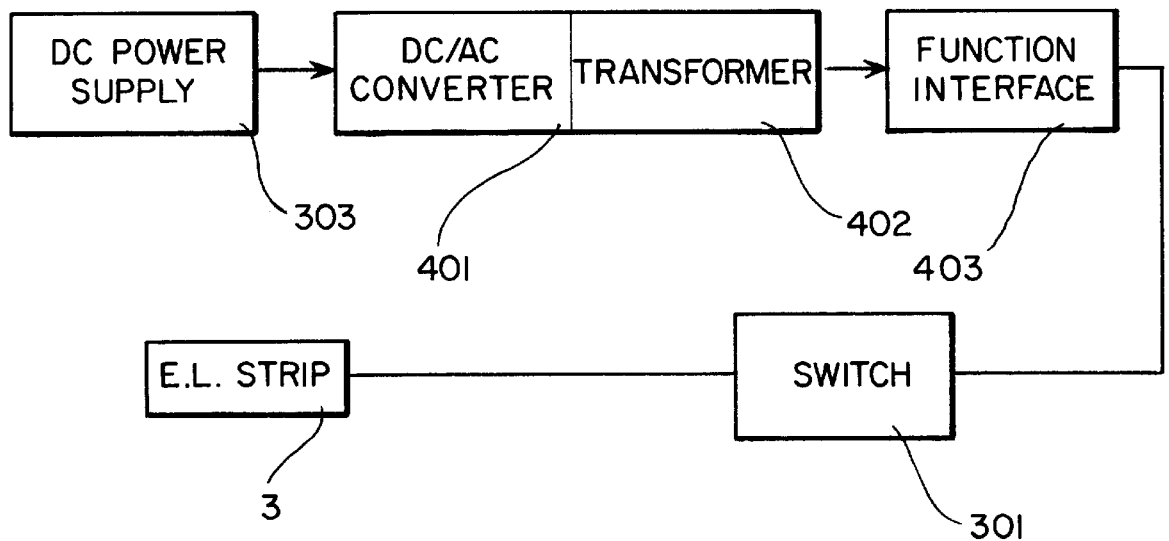
FIG. 7 is a block diagram of electrical components which may be used in the implementations of the preferred embodiment illustrated in FIGS. 1–6.
Figure 8:
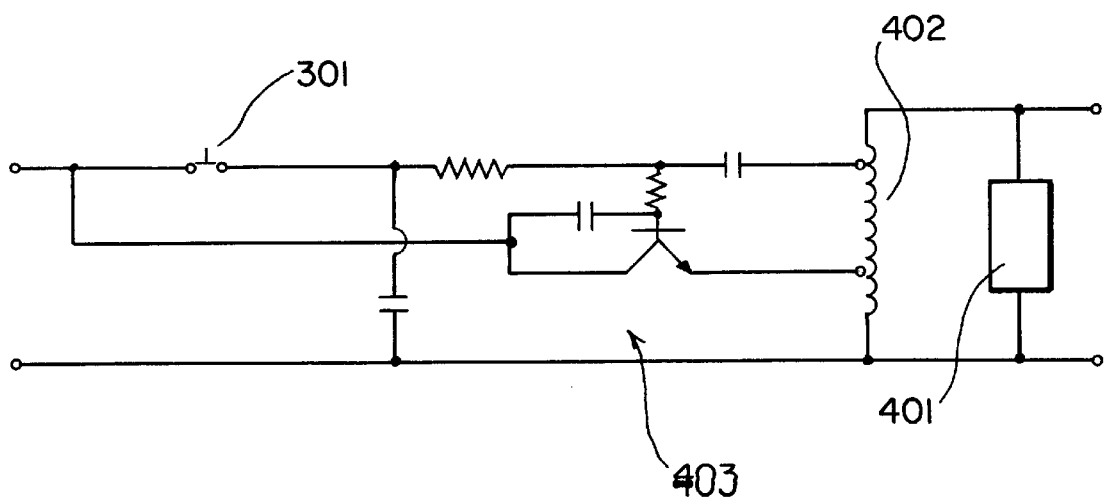
FIG. 8 is a circuit diagram illustrating in greater detail the electrical circuitry used in the block diagram of FIG. 7.

As shown in FIGS. 7 and 8, the DC power supply 303 is a dry cell battery (which can take the form of battery 46 shown in FIG. 5, but can also take other forms) which can easily be attached to the backpack or waistpack because of its small size and weight. In order to operate the electro-luminescent light panel, the DC current supplied by the battery must be converted to AC power and, consequently, as shown in FIGS. 7 and 8, the DC power source 303 is electrically connected to the electro-luminescent light strip 2 via a circuit including a DC/AC converter 401 electrically connected with a transformer 402, transformer 402 being further electrically connected with a function interface 403 and, via parallel connected switch 301, with the electro-luminescent strip 2.

In operation, the direct current supplied by DC power source 303 is thus converted into an alternating current of a desired frequency by DC/AC converter 401 to the transformer 402 for increasing the voltage of the alternating current, and then transmitted from the transformer 402 to the function interface 403. Function interface 403 provides a number of preset or switchable options for turning on the electro-luminescent light strip 2, e.g., steady, flash, sequential or random, and may take any desired form from a simple flasher circuit illustrated in FIG. 5 to a microprocessor, depending on the complexity of the special effects to be exhibited. Those skilled in the art will appreciate that the number of options is greatly increased if a multiple element strip such as the one disclosed in the above-mentioned U.S. patent application Ser. No. 08/305,294 is utilized. Also, while the electro-luminescent light strip can be turned on and off by means of a manual push button switch 301, it may also be desired to include or substitute a photosensitive, vibration-sensitive, tilt-sensitive, or motion-sensitive switch to automatically turn the light on and off upon the occurrence of external events such as nightfall or various movements by the wearer.

Turning now to FIG. 9, which shows the same main object 1 in the form of a boot as is shown in FIG. 1, in assembled form, but with the particularly advantageous feature of providing illumination of the upper portion of the main object. As is conventional, the main object in this implementation is a hard surfaced boot containing a plurality of ventilation holes, openings, or apertures 3K–3P. However, these ventilation holes are uniquely used as part of the main object illumination arrangement by providing, on the soft textile liner 7 of the boot, a plurality of EL strips 3F–3J, which are conveniently attached to the lining by stitching, gluing, Velcro™ or any other desired means such as a leather insert or pocket. One of the advantages of EL strips or panels is that they can easily be attached to other surfaces by a variety of means, and because of their flexibility can in particularly be attached to a soft surface. The EL strips can in particular use the quick-connect arrangement of FIG. 5A to allow replacement of insoles or liners as necessary without having to replace the entire boot. In addition to attaching the EL strips to the soft textile liner of the main object, additional EL strips 3Q and 3R may also be attached to the moving base, as shown in FIG. 10.

Figure 11:
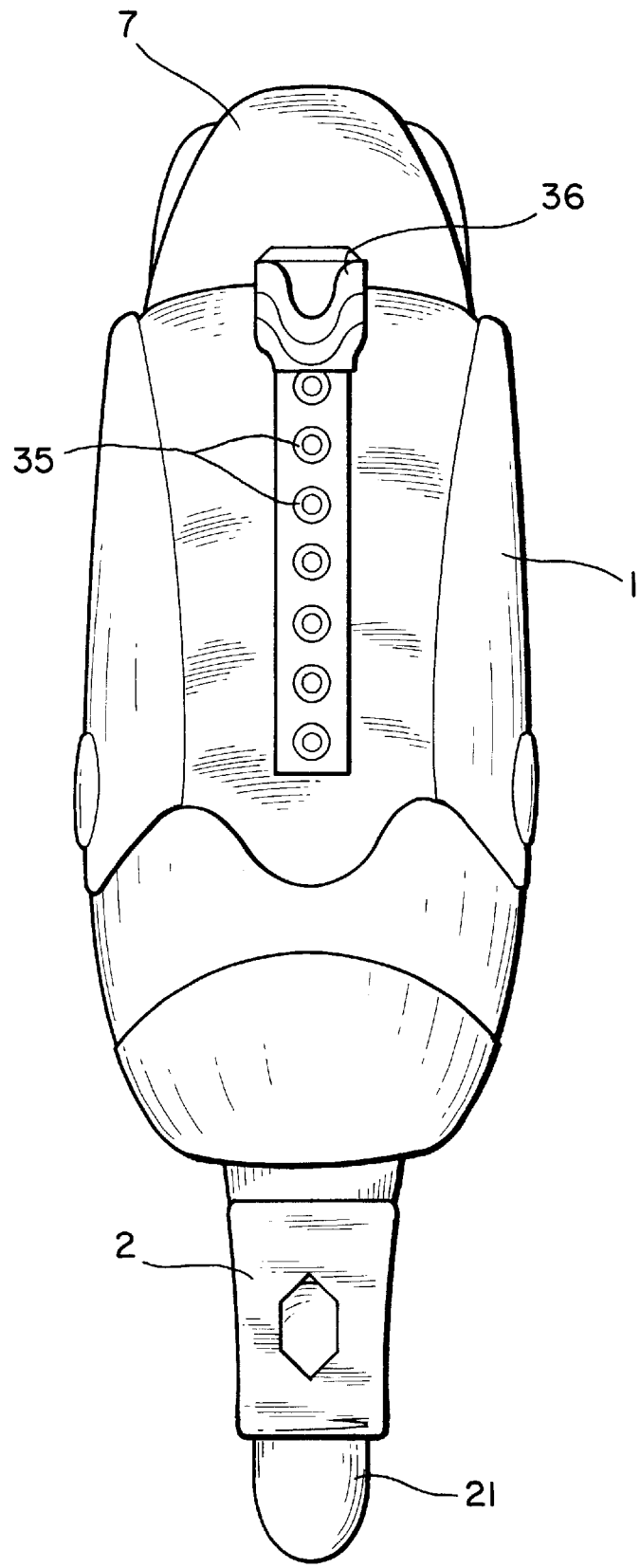
FIG. 11 is a top view of a variation of the preferred embodiment illustrated in FIGS. 1–6.

Finally, with respect to the implementations of the preferred embodiment shown in FIGS. 1–11 and described above, the illumination means of the present invention are not necessarily limited to EL strips, although E1 strips or panels are particularly advantageous for the embodiments shown in FIGS. 1–6 and 9. The manner in which the power pack is arranged on an "outsole" positioned between the sole of the boot and the roller or skate bracket is itself a unique feature apart from the use of EL strips or panels, and thus it is contemplated that some of the EL strips could be replaced in certain implementations by bulbs, either incandescent, LED, photoluminescent or other type of lighting such as fiber optics. Alternatively, as illustrated in FIG. 10, the lighting elements 3R and 3Q can be directly mounted on the bracket 108 to which the housing 42 is attached. Also as shown in FIG. 11, a plurality of elements 35 are molded or inserted into openings in the hard plastic boot, and in addition illumination 36 of the laces is provided.

Figure 12:
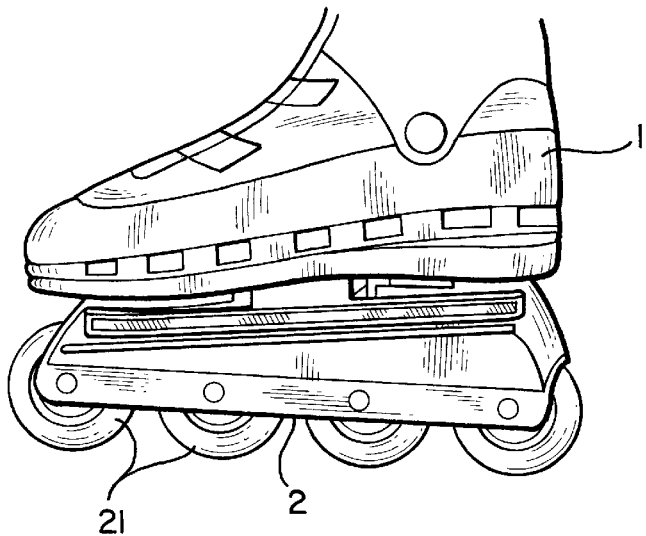
FIG. 12 is a perspective view of an illuminated main object and moving base in the form of an in-line roller skate constructed in accordance with the principles of an alternative preferred embodiment of the invention.
Figure 13:
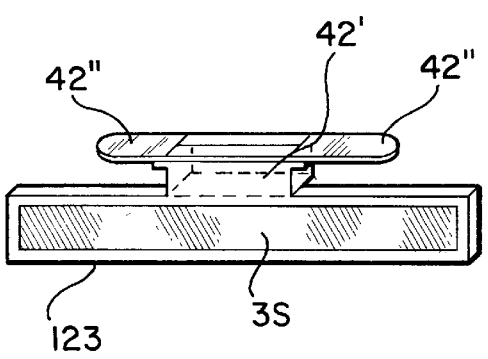
FIG. 13 is a perspective view of an illumination means mounting fixture and power supply housing for use in the embodiment illustrated in FIG. 12.
Figure 14:
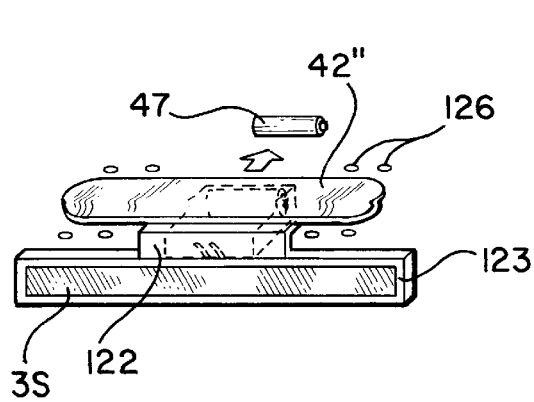
FIG. 14 is a perspective view illustrating a modification of the fixture and housing arrangement shown in FIG. 13.
Figure 16:
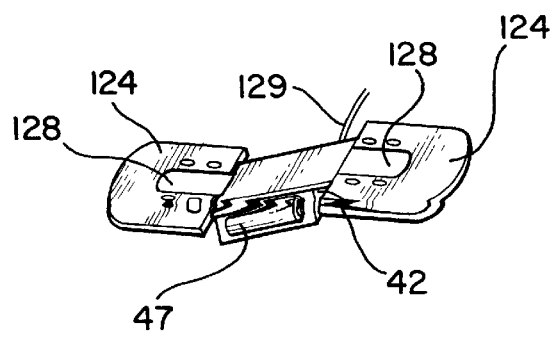
FIG. 16 is a perspective view of yet another alternative power pack arrangement for use with implementations of any of the preferred embodiments of the invention.

In a variation of the above embodiments, a bracket such as is illustrated in FIGS. 12–14 could be used to mount the power pack and associated circuitry. In this embodiment, the power pack 42' has extending therefrom two relatively thin mounting plates 42" which fit between the openings 126 by which the moving base is mounted to the main object, and extending downwardly therefrom an EL fixture 123 which contains an EL strip 3S and associated electrical connections. Fixture 123 can either extend directly from housing 42' or from an extension bracket 122 depending on the configuration of the main object and moving base to which the housing and fixture are to be attached.

Figure 15:
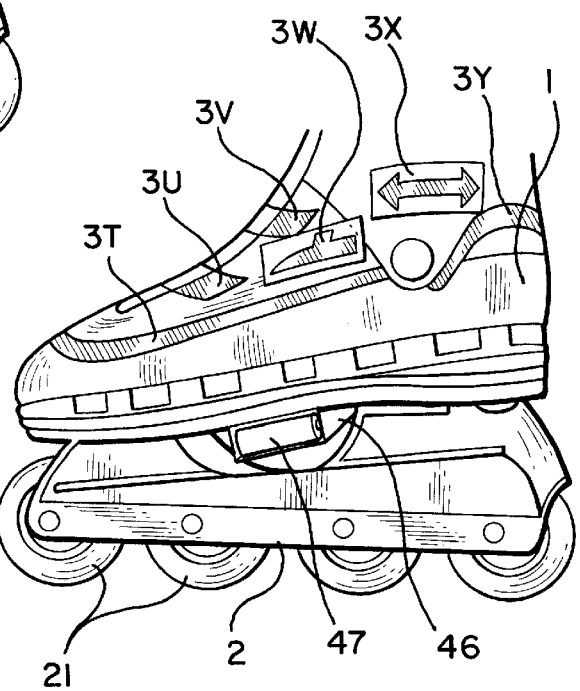
FIG. 15 is a perspective view of an illuminated main object and moving base in the form of an in-line roller skate constructed in accordance with the principles of yet another alternative preferred embodiment of the invention.

In yet another variation of the above implementations, the hard surface boot or other hard main object may be made of a completely transparent material, so that the EL strips or panels on the soft-textile liner can be placed anywhere and have any desired size or shape, with appropriate wires and terminals molded into the main object material. Alternatively, as shown in FIG. 15, EL strips 3T–3Y could simply be glued or otherwise affixed to the inner surface of the transparent hard plastic boot and still have any desired shape and size, and be placed at any desired location. Such EL strips 3T–3Y could be connected with the power pack by drilling holes somewhere in the sole to permit connection to the power pack.

Finally, in a still further variation of the power pack, the power pack 42 could be affixed to indentations in a bracket 124 by gluing or by using double-sided tape 128 in the configuration shown in FIG. 13.

Having thus described a preferred embodiment of the invention and a number of different variations and modifications of the preferred embodiment, it is anticipated that still further variations and modifications will undoubtedly occur to those skilled in the art upon reading the above description, and it is therefore intended that the invention be interpreted, in accordance with the appended claims, to cover all such variations and modifications which fairly fall within the scope of the invention.

I claim:

1. In an apparatus, comprising:
   a main object arranged to be moved when an outside force is applied to the object;
   a moving base arranged to permit the main object to move when the outside force is applied to the main object by overcoming a resistance to movement of the main object which would otherwise be present;
   an illumination arrangement which includes an electro-luminescent light source and means for securing the electro-luminescent light source to the main object; and
   means including a power supply and controlling circuitry mounted to the apparatus for supplying power to and controlling the electro-luminescent light source, the improvement wherein
   the means for securing the electro-luminescent light source to the main object comprises means for securing the light source to the main object in a location which both protects the light source and enables the light source to be directly visible to a viewer.

2. Apparatus as claimed in claim 1, further comprising installation means for attaching the moving base to the main object, and wherein the illumination arrangement includes an opening through which the installation means extend when the moving base is attached to the main object.

3. Apparatus as claimed in claim 2, wherein the installation means consists of fasteners selected from the group consisting of rivets, bolts, or screws.

4. Apparatus as claimed in claim 3, wherein the illumination means includes a transparent plate containing attachment means for attaching lighting elements within the plate.

5. Apparatus as claimed in claim 4, wherein said plate is recessed in a vicinity of said openings so as minimize an amount by which the installation means must be extended when the plate is added to an existing installation.

6. Apparatus as claimed in claim 1, wherein said main body is selected from the group consisting of a boot, board, or toy, and said moving base is selected from the group consisting of a roller skate bracket, an ice skate blade mounting bracket, or a wheel mounting bracket of a toy.

7. Apparatus as claimed in claim 1, wherein said illumination arrangement includes a housing for a power supply and electrical circuitry having extending therefrom mounting post/terminals for supporting and electrically connecting a plurality of different lighting arrangements to electrical components within said housing.

8. Apparatus as claimed in claim 1, wherein said main object is transparent and said illumination arrangement includes a plurality of electro-luminescent strips attached to an inside surface of the main object.

9. Apparatus as claimed in claim 1, wherein said main object is a boot, and wherein the lighting arrangement includes means for illuminating laces of the boot.

10. In an apparatus, comprising:
    a main object arranged to be moved when an outside force is applied to the object;
    a moving base arranged to permit the main object to move when the outside force is applied to the main object by overcoming a resistance to movement of the main object which would otherwise be present, the improvement wherein
    an illumination arrangement including a power supply and controlling circuitry is mounted between the main object and moving base,
    wherein the illumination means includes a transparent member containing attachment means for attaching lighting elements within the member, and
    wherein the lighting elements are electro-luminescent strips, and the attachment means comprises grooves which open into a surface of the member which faces the main object, the EL strips being sealed within the grooves upon sandwiching of the member between the moving base and the main object when the moving base is attached to the main object.

11. Apparatus as claimed in claim 10, further comprising a housing containing said power supply and electrical circuitry extending from said plate and open towards said main object facing surface of the plate so as to be sealed when the moving base is attached to the main object.

12. Apparatus as claimed in claim 11, wherein said housing has extending therefrom mounting post/terminals for supporting and electrically connecting a plurality of different lighting arrangements to electrical components within said housing.

13. In an apparatus, comprising:
    a main object arranged to be moved when an outside force is applied to the object;
    a moving base arranged to permit the main object to move when the outside force is applied to the main object by overcoming a resistance to movement of the main object which would otherwise be present, the improvement wherein
    an illumination arrangement including a power supply and controlling circuitry is mounted between the main object and moving base,
    wherein the illumination means includes a transparent member containing attachment means for attaching lighting elements within the member, and
    wherein said main body is a boot, said moving base is a skate mounting bracket, and said member is an outsole arranged to fit between a sole of the boot and the skate mounting bracket.

14. Apparatus as claimed in claim 13, further comprising installation means for attaching the skate mounting bracket to a sole of the boot, wherein the illumination arrangement includes an opening through which the installation means extend when the moving base is attached to the main object.

15. Apparatus as claimed in claim 14, wherein the installation means consists of fasteners selected from the group consisting of rivets, bolts, or screws.

16. Apparatus as claimed in claim 15, wherein the illumination means includes a transparent outsole containing attachment means for attaching lighting elements within the outsole.

17. Apparatus as claimed in claim 16, wherein the lighting elements are electro-luminescent strips, and the attachment means comprises grooves which open into a surface of the plate which faces the main object, the EL strips being sealed within the grooves upon sandwiching of the plate between the mounting bracket and the sole of the boot when the moving base is attached to the main object.

18. Apparatus as claimed in claim 14, further comprising a housing containing said power supply and electrical circuitry extending from an outsole and open towards a sole of the boot so as to be sealed when the mounting bracket is attached to the boot.

19. In an apparatus, comprising:
a main object arranged to be moved when an outside force is applied to the object;
a moving base arranged to permit the main object to move when the outside force is applied to the main object by overcoming a resistance to movement of the main object which would otherwise be present, the improvement wherein
an illumination arrangement including a power supply and controlling circuitry is mounted between the main object and moving base,
wherein the illumination means includes a transparent member containing attachment means for attaching lighting elements within the member, and
wherein said main body includes a plurality of openings and a soft textile liner which fits inside the main body, and wherein the illumination arrangement includes a plurality of electroluminescent light strips attached to the soft textile liner and visible through said openings.

20. Apparatus as claimed in claim 19, wherein said main body is a hard surface boot of a skate.

21. In an apparatus, comprising:
a main object arranged to be moved when an outside force is applied to the object;
a moving base arranged to permit the main object to move when the outside force is applied to the main object by overcoming a resistance to movement of the main object which would otherwise be present; and
an illumination arrangement the improvement wherein
the illumination arrangement includes an electroluminescent light source and means for securing the light source to the main object in a location which protects the light source from damage while still enabling the light source to be directly visible to a viewer, and wherein a power supply and controlling circuitry for the illumination arrangement are mounted between the main object and moving base.

22. Apparatus as claimed in claim 21, wherein the main object includes ventilation openings, and wherein the illumination arrangement is arranged to be visible through said ventilation openings.

23. Apparatus as claimed in claim 21, wherein said illumination arrangement comprises a plurality of lighting elements arranged at a plurality of locations on said main object.

24. Apparatus as claimed in claim 21, wherein said main object is transparent and said illumination arrangement is positioned on an inside surface of said main object so as to be visible through the main object.

25. In an apparatus, comprising:
a main object arranged to be moved when an outside force is applied to the object;
a moving base arranged to permit the main object to move when the outside force is applied to the main object by overcoming a resistance to movement of the main object which would otherwise be present, the improvement wherein
an illumination arrangement including an electro-luminescent light source situated in a groove in a surface of the moving base, and a power supply and controlling circuitry for the illumination arrangement are mounted on the apparatus.

26. In an apparatus, comprising:
a main object arranged to be moved when an outside force is applied to the object;
a moving base arranged to permit the main object to move when the outside force is applied to the main object by overcoming a resistance to movement of the main object which would otherwise be present, the improvement comprising:
an illumination arrangement including an electro-luminescent light source situated away from an exterior surface of the apparatus so as to be protected from impacts while facing outwardly from the device so as to be directly visible to a viewer; and
a bracket positioned between the main object and the moving base to which is mounted a power pack and associated circuitry for controlling the illumination arrangement.

27. Apparatus as claimed in claim 26, wherein the illumination arrangement is contained in a fixture extending from the bracket.

* * * * *